(12) United States Patent
Alston et al.

(10) Patent No.: US 9,017,774 B2
(45) Date of Patent: Apr. 28, 2015

(54) METHOD FOR MARKING A COATED SUBSTRATE

(75) Inventors: Christopher Alston, Warrimoo (AU); Greg Brunton, Sydney (AU); Peter Pagones, Sydney (AU); Joseph Sanegor, Sydney (AU)

(73) Assignee: James Hardie Technology Limtied, Dublin (IE)

( * ) Notice: Subject to any disclaimer, the term of this patent is extended or adjusted under 35 U.S.C. 154(b) by 359 days.

(21) Appl. No.: 13/164,786

(22) Filed: Jun. 21, 2011

(65) Prior Publication Data

US 2011/0311779 A1 Dec. 22, 2011

(30) Foreign Application Priority Data

Jun. 21, 2010 (GB) .................................. 1010346.3

(51) Int. Cl.
| | | |
|---|---|---|
| C04B 12/00 | (2006.01) | |
| C04B 41/00 | (2006.01) | |
| C04B 41/48 | (2006.01) | |
| C04B 41/63 | (2006.01) | |
| B05D 3/00 | (2006.01) | |
| B05D 5/06 | (2006.01) | |

(52) U.S. Cl.
CPC .............. *C04B 41/009* (2013.01); *B05D 5/061* (2013.01); *B05D 3/002* (2013.01); *C04B 41/48* (2013.01); *C04B 41/63* (2013.01)

(58) Field of Classification Search
None
See application file for complete search history.

(56) References Cited

U.S. PATENT DOCUMENTS

| | | | |
|---|---|---|---|
| 5,030,551 A * | 7/1991 | Herren et al. ............... 430/495.1 |
| 5,538,764 A | 7/1996 | Li | |
| 5,554,335 A * | 9/1996 | Fields et al. ................... 264/400 |
| 5,673,489 A | 10/1997 | Robell | |
| 5,842,280 A | 12/1998 | Robell | |
| 6,049,987 A | 4/2000 | Robell | |
| 6,115,926 A | 9/2000 | Robell | |
| 6,635,846 B1 | 10/2003 | Rieck | |
| 6,822,192 B1 | 11/2004 | Young | |
| 7,919,191 B2 * | 4/2011 | Arnold ........................ 428/542.2 |
| 2004/0137201 A1 * | 7/2004 | Hannan et al. ................. 428/172 |
| 2004/0197490 A1 | 10/2004 | Rieck | |
| 2005/0208285 A1 | 9/2005 | Lyons | |

(Continued)

FOREIGN PATENT DOCUMENTS

| | | |
|---|---|---|
| AU | 198060655 | 3/1981 |
| AU | 2005100347 | 5/2005 |

(Continued)

OTHER PUBLICATIONS

Gokce et al., "Bond Strengths of All-Ceramics: Acid vs Laser Etching." Operative Dentistry 32 (2) 173-178 Mar. 2007.
Cavalcanti et al., "Bond Strength of Resin Cements to a Zirconia Ceramic with Different Surface Treatments." Operative Dentistry 34 (3) 280-287 May 2009.

(Continued)

*Primary Examiner* — Dah-Wei D Yuan
*Assistant Examiner* — Jose Hernandez-Diaz
(74) *Attorney, Agent, or Firm* — Knobbe, Martens, Olson & Bear, LLP (57) ABSTRACT

The present invention relates to methods for marking a coated substrate. In particular, the present invention relates to methods for marking a coated substantially cementitious substrate in the form of a cementitious building product. The method comprises the steps of treating at least a portion of an uncoated cementitious substrate to form indicia; and applying a surface coating on said cementitious substrate to at least partially cover said indicia such that a marking is formed.

8 Claims, 6 Drawing Sheets

(56) References Cited

U.S. PATENT DOCUMENTS

| 2006/0288909 | A1 | 12/2006 | Naji | |
|---|---|---|---|---|
| 2007/0098907 | A1* | 5/2007 | Bezubic, Jr. | 427/403 |
| 2007/0108170 | A1 | 5/2007 | Costin, Sr. | |
| 2008/0124498 | A1* | 5/2008 | Cole et al. | 428/29 |
| 2010/0006546 | A1 | 1/2010 | Young | |

FOREIGN PATENT DOCUMENTS

| EP | 2048125 | 10/2007 |
|---|---|---|
| GB | 375045 | 6/1932 |
| GB | 2423498 | 7/2007 |
| JP | 22 79573 | 4/1989 |
| JP | 03174376 | 9/1989 |
| JP | 4292488 | 3/1991 |
| JP | 2005226303 | 2/2004 |
| JP | 2005238075 | 2/2004 |
| JP | 2006088106 | 9/2004 |
| WO | WO98/45222 | 10/1998 |
| WO | WO01/68547 | 9/2001 |

OTHER PUBLICATIONS

Laser Edge Designs: Surfaces http://www.laseredgedesigns.com/surfaces.htm, downloaded Feb. 8, 2011.

Terro White Laser Engraved Bricks—A guide to the Process http://ezinearticles.com/?Laser-Engraved-Bricks--A-Guide-to-the-Process&id=4190198, downloaded Feb. 8, 2011.

Applications of Laser Dentistry: A Review: http://articlescbase.com/dental-care-articles/applications-oflasers-in-dentistry-a-review-2074376.html.

EJ Melendeza et al. "Effect of laser-etch on bond strengths of glass ionomers." The Journal of Prosthetic Dentistry 67 3 307-312 Mar. 1993.

UKIPO Search Report for priority filing GB1010332.3 dated Oct. 27, 2010.

IPONZ Examiner's First Report for 593589 dated Jun. 24, 2011.

UKIPO Search Report for priority filing GB1010346.3 dated Oct. 27, 2010.

IPONZ Examiner's First Report for 593590 dated Jun. 24, 2011.

* cited by examiner

Fig. 1: Laser etching raw board. Markings appear as "watermarks" on coated product Fig. 2: Laser etching coated product. Marks appear as visually distinct markings on coated product. Colour may vary between marked and unmarked regions.

Fig. 4: Laser etching raw board prior to coating

Fig. 5: Laser etched board with surface coating showing watermarking

Fig. 6: Laser marked surface coating

Fig. 7: Laser marked surface coating with varying degrees of laser power

METHOD FOR MARKING A COATED SUBSTRATE

FIELD OF THE INVENTION

The present invention relates to methods for marking a coated substrate. In particular, the present invention relates to methods for marking a coated substantially cementitious substrate in the form of a cementitious building product, and will be described hereinafter with reference to this application. However, it will be appreciated that the invention is not limited to this particular field of use.

BACKGROUND OF THE INVENTION

The following discussion of the prior art is provided to place the invention in an appropriate technical context and enable the advantages of it to be more fully understood. It should be appreciated, however, that any discussion of the prior art throughout the specification should not be considered as an express or implied admission that such prior art is widely known or forms part of common general knowledge in the field.

The prior art discloses various methods to mark substrates. For example, it is known to use ink-jet printing methods to apply visual indicia to, for example, a building product such as a sheet of fibre cement or a coated building product. The visual indicia can take many forms, such as to indicate the source of the product, or product specifications, or product barcodes, trademarks, or other descriptors, etc. It is also known to print other visual indicia for the convenience of the installer, such as measurement markings, measurement grids, nailing guides, etc. For example see U.S. Pat. No. 5,673,489, U.S. Pat. No. 5,842,280, U.S. Pat. No. 6,115,926 and U.S. Pat. No. 6,049,987 to Robell which disclose various printing methods for printing visual indicia on wallboards, including ink-jet printing, screen printing and pad printing. However, these printing processes are costly and difficult to use. For example the ink adds cost to the final product and, for example, the ink-jet printing heads require constant maintenance and can relatively easily break down during production. Further, it will be appreciated that the entire intended visual marking can be ruined if but one of the many ink-jet heads fails or becomes blocked during use, thereby causing the product to be "faulty", even if the substrate is fit for purpose. Also, re-working a sheet having an applied marking which is faulty is clearly inconvenient and costly.

What is needed is a way to mark a coated substrate which is substantially cementitious in composition without the need for relatively expensive inks, and without using relatively delicate printing equipment.

It is an object of the present invention to overcome or ameliorate at least one of the disadvantages of the above-mentioned prior art, or to provide a useful alternative.

SUMMARY OF THE INVENTION

The present invention relates generally to methods for marking coated substrates. Various embodiments of the invention are discussed in the following. However, the embodiments can be categorised into 2 groups, namely, methods for providing "watermarked" coated substrates and methods for marking the coating of a coated substrate. The former relates, in a preferred embodiment, to a surface relief pattern and the latter relates to marking a coating, preferably by affecting the coating binder and/or the pigments dispersed in the binder.

As used herein, a "watermark" refers to a distinguishing mark which is impressed, embossed or etched into a substrate, typically during manufacture of the substrate, and which is visually perceptible once a surface coating is applied over the impressed/embossed/etched region of the substrate. The resulting watermark may also be described as a surface relief pattern. In another embodiment, the watermark could be formed by treatment of the substrate, for example to cause a roughened appearance on a smooth surface of the substrate, or vice versa, following by coating with a surface coating. The watermark is a recognizable image or pattern which is best revealed in various shades of lightness/darkness when viewed in reflected light.

According to a first aspect the present invention provides a method for providing a marked coated cementitious substrate, the method comprising the steps of: treating at least a portion of an uncoated cementitious substrate to form indicia; and applying a surface coating on said cementitious substrate to at least partially cover said indicia such that a marking is formed.

In one embodiment the uncoated cementitious substrate is treated by etching the surface to form said indicia and the surface coating is then applied. The indicia, or indicium, are preferably shallow channels or grooves. It will be appreciated that the etching is caused to be sufficiently deep and the coating selected to be sufficiently thin when cured to cause a visually perceptible marking to be formed i.e. a watermark.

In this embodiment, it will be appreciated that the watermark is particularly useful for "primed" or "undercoated" fibre cement building products. In this example the watermark will be visible on pre-prepared or primed boards, and once installed and a top coating surface coating layer is applied (typically by professional painters or even DIY'ers) the watermark will no longer be visible since the top coating surface coating layer is chosen to be sufficiently thick when cured to mask the relatively shallow watermark. If the watermark is formed on a coated surface of a building product and that surface is intended to be a concealed surface, such as the rear-ward facing surface of the board when installed, the watermark is useful to identify the product, particulars of the product, or other features such as installation marks etc. Of course if the watermark is formed on an outward facing surface of the board further coatings may need to be applied to mask the watermark, as discussed above.

In another embodiment the uncoated cementitious substrate is treated by causing a differential in roughness. To explain, the surface of a cementitious substrate has a certain roughness, and the surface can be treated by, say, exposure to certain kinds of radiation to cause the surface roughness to be substantially increased, or substantially decreased, depending on the kind of radiation, its intensity, etc. The treated portions of the substrate which are substantially increased/decreased in surface roughness compared to the untreated portions are revealed as markings when a surface coating is applied over the top of the coated and uncoated portions. Without wishing to be bound by theory, it is believed that this is due to a change in surface coating gloss levels caused by the roughness differences of the underlying treated and untreated portions of the substrate. The gloss level differences of the surface coating appear as a surface marking, i.e. a watermark.

The surface treatment may be accomplished by use of non-ionising or ionising radiation. An example of non-ionising radiation is laser radiation, and examples of ionising radiation are electron-beam (EB) or plasma. Depending on the type of radiation it will be appreciated that a mask may need to be applied to the surface to be treated in order to obtain the indicia.

Preferably the marking is predetermined. Preferably the surface treatment forms indicia which may be decorative/aesthetic or symbolic, for example words, letters, nailing marks, etc.

In further embodiments the coating applied over the treated substrate may not include a tint or opacifyers (i.e. a clear coating). However, in other embodiments the coating may be opaque, wherein the intensity of the watermark is strengthened or increased by light reflection off marked surfaces compared to unmarked surfaces. In this embodiment the depth of tint may assist in controlling the intensity of the watermark.

Preferably the treatment method of the invention vitrescently marks the substantially cementitious substrate to form the indicia, and does so without significant surface ablation. The substrate may be an uncured or "green" cementitious body, or may be substantially cured.

According to a second aspect the present invention provides a coated cementitious substrate marked by the method according to the first aspect.

As used throughout this specification, the term vitrification should be construed as a process of converting a material into a glass-like amorphous solid which is substantially free of any crystalline structure. Typically, vitrification of a material is achieved by exposing the material to heat. A vitrescent material is one which is substantially vitrifyable. It will be appreciated that the process of vitrification causes a surface roughness difference between the vitrified portion of the substrate compared to the untreated portions.

Preferably the substrate is hydraulically bonded and comprises fibre reinforcement. Preferably the fibre reinforcement is cellulose. Preferably the substrate is unfired and may predominantly comprise hydrated silicates of calcium. Preferably the substrate is hydrated and may have a water content of between about 8 to 40%. The water content of the cementitious substrate comprises bound and unbound water. In one embodiment, preferably the water content of the substrate is not removed prior to vitrification/irradiation. However, in another embodiment the water content of the substrate is reduced prior to vitrification/irradiation. Preferably the substrate is unfired (i.e. not a fired ceramic).

A variety of fibre cement board substrates may be employed in the present invention. The disclosed substrates typically include cement and a filler. Exemplary fillers include wood, fiberglass, polymers or mixtures thereof. The substrates can be made using methods such as extrusion, the Hatschek method, or other methods known in the art. See, e.g., U.S. Patent Application No. 2005/0208285 A1 (corresponds to International Patent Application No. WO 2005/071179 A1); Australian Patent Application No. 2005100347; International Patent Application No. WO 01/68547 A1; International Patent Application No. WO 98/45222 A1; U.S. Patent Application Nos. 2006/0288909 A1 and 2006/0288909 A1; and Australian Patent Application No. 198060655 A1. Non-limiting examples of such substrates include siding products, boards and the like, for uses including fencing, roofing, flooring, wall boards, shower boards, lap siding, vertical siding, soffit panels, trim boards, shaped edge shingle replicas and stone or stucco replicas. One or both major surfaces of the substrate may be profiled or embossed to look like a grained or roughsawn wood or other building product, or scalloped or cut to resemble shingles. The uncoated substrate surface typically contains a plurality of pores with micron- or submicron-scale cross-sectional dimensions.

A variety of suitable fiber cement substrates are commercially available. For example, several preferred fiber cement siding products are available from James Hardie Building Products Inc. of Mission Viejo, Calif., including those sold as HARDIEHOME™ siding, HARDIPANEL™ vertical siding, HARDIPLANK™ lap siding, HARDIESOFFIT™ panels, HARDITRIM™ planks and HARDISHINGLE™ siding. These products are available with an extended warranty, and are said to resist moisture damage, to require only low maintenance, to not crack, rot or delaminate, to resist damage from extended exposure to humidity, rain, snow, salt air and termites, to be non-combustible, and to offer the warmth of wood and the durability of fibre cement. Other suitable fiber cement siding substrates include cement board products from Knauf USG Systems GmbH & Co. KG of Iserlohn, Germany, CEMPLANK™, CEMPANEL™ and CEMTRIM™; WEATHERBOARDS™ cement board products from CertainTeed Corporation of Valley Forge, Pa.; MAXITILE™, MAXISHAKE™ and MAXISLATE™ cement board products from MaxiTile Inc. of Carson, Calif.; BRESTONE™, CINDERSTONE™, LEDGESTONE™, NEWPORT BRICK™, SIERRA PREMIUM™ and VINTAGE BRICK™ cement board products from Nichiha U.S.A., Inc. of Norcross, Ga., EVERNICE™ cement board products from Zhangjiagang Evernice Building Materials Co., Ltd. of China and E BOARD™ cement board products from Everest Industries Ltd. of India.

Whilst fibre cement substrates have been illustrated in the foregoing, the skilled person will appreciate that other cementitious substrates fall within the purview of the present invention.

It will be appreciated that the depth of the etching or embossing may be any depth and the thickness of the cured coating may be any thickness provided that a visually perceptible marking or watermark is formed. Typical etching depths may be selected from 0.1, 0.25, 0.5, 0.75, 1, 2, 3, 4, 5, 6, 7, 8, 9, 10, 20, 30, 40, 50, 100, 250 or 500 micron, and typical coating thicknesses may be selected from 0.1, 0.25, 0.5, 0.75, 1, 2, 3, 4, 5, 6, 7, 8, 9, 10, 20, 30, 40, 50, 100, 250 or 500 micron.

According to a third aspect the present invention provides a method for marking a coated cementitious substrate, the method comprising the steps of: providing said coated cementitious substrate, and irradiating at least a portion of the coating of said coated cementitious substrate to form said marking.

According to a fourth aspect the present invention provides a coated cementitious substrate marked by the method according to the third aspect.

In one embodiment the irradiation step comprises applying controlled irradiation, which is preferably laser irradiation. Preferably the coated substrate is marked with various degrees of penetration of the surface coating, from surface marking the coating to cause its discolouration, to complete ablation of the coating to reveal the subjacent cementitious substrate, and even etching into the cementitious substrate.

In certain aspects the radiation is chosen (wavelength, energy density) to produce a colour difference (or reflectivity difference) between the irradiated portion and the non-irradiated portion. Alternatively, the radiation is chosen (wavelength, energy density) to ablate the surface coating to form a channel and expose the underlying substrate, optionally with vitrification of the substrate. Alternatively, the composition of the coating is selected to have certain pigments which irreversibly, or at least temporarily, change colour upon exposure to the radiation. For example some radiation treatment induced colour changes may not be permanent or may fade with time and/or temperature.

In related embodiments the coating and pigments are selected such that the marked coating is particularly visible under certain lighting conditions. For example fluorescent lights compared to natural lighting conditions, or vice versa, or under UV illumination.

In the case of the first aspect, the substrate is irradiated with an energy source which in preferred embodiments is a laser, and in the case of the second aspect, the coating is irradiated with a laser. However, the skilled person will appreciate that other sources of energy could be used. Preferably the laser is a Nd:YAG, excimer, or carbon dioxide laser and the wavelength(s) of laser light are chosen to vitrify the substrate, or to mark the coating. Preferably the substrate is irradiated for a sufficient time and with sufficient energy to at least partially vitrify the surface thereby marking the substrate and without ablation of the surface. At least partial vitrification of the substrate may be achieved by using laser power densities of between about 500 to 15000 $W/cm^2$.

The skilled person will appreciate that the laser spot size may be any size to suit the intended size and shape of the intended indicia, however spot sizes between about 0.3 to 1 mm diameter are particularly preferred for relatively large markings and 0.15 to 0.22 mm diameter for small and intricate patterns, such as a barcode. Preferably the substrate is not substantially heated during the irradiation process and only localised heating is applied.

The present invention enables indicia to be applied to a cementitious substrate or a surface coating, without the added cost of relatively expensive inks and without using relatively delicate equipment. To explain, the present invention utilises a laser to mark a cementitious substrate, which is preferably a fibre cement building product. The skilled person will appreciate that lasers are relatively inexpensive and are relatively robust, and operate without the need for consumables and with minimal maintenance. Lasers are also particularly useful in a dirty industrial manufacturing setting, for example the laser can be housed in a remote location from the substrate or the coating being marked and the laser light conveniently delivered to the target site by way of fibre optics.

BRIEF DESCRIPTION OF THE DRAWINGS

Preferred embodiments of the invention will now be described, by way of example only, with reference to the accompanying drawings in which.

DETAILED DESCRIPTION OF THE INVENTION

In describing and claiming the present invention, the following terminology will be used in accordance with the definitions set out below. It is also to be understood that the terminology used herein is for the purpose of describing particular embodiments of the invention only and is not intended to be limiting. Unless defined otherwise, all technical and scientific terms used herein have the same meaning as commonly understood by one having ordinary skill in the art to which the invention pertains.

The terms "predominantly" and "substantially" as used herein shall mean comprising more than 50% by weight, unless otherwise indicated.

Other than in the operating examples, or where otherwise indicated, all numbers expressing quantities of ingredients or reaction conditions used herein are to be understood as modified in all instances by the term "about". The examples are not intended to limit the scope of the invention. In what follows, or where otherwise indicated, "%" will mean "weight %", "ratio" will mean "weight ratio" and "parts" will mean "weight parts".

The recitation of a numerical range using endpoints includes all numbers subsumed within that range (e.g., 1 to 5 includes 1, 1.5, 2, 2.75, 3, 3.80, 4, 5, etc.).

The term "board" refers to a generally planar component suitable for attachment to a building exterior surface, including but not limited to lap siding, vertical siding, soffit panels, trim boards, shingle replicas, stone replicas and stucco replicas.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

The enumerated listing of items does not imply that any or all of the items are mutually exclusive. The enumerated listing of items does not imply that any or all of the items are collectively exhaustive of anything, unless expressly specified otherwise. The enumerated listing of items does not imply that the items are ordered in any manner according to the order in which they are enumerated.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The terms "a", "an" and "the" mean "one or more", unless expressly specified otherwise.

Headings of sections provided in this patent application and the title of this patent application are for convenience only, and are not to be taken as limiting the disclosure in any way.

Throughout the figures presented herein like features have been given like reference numerals. The present invention will now be described with reference to the following examples which should be considered in all respects as illustrative and non-restrictive.

Figure 1:
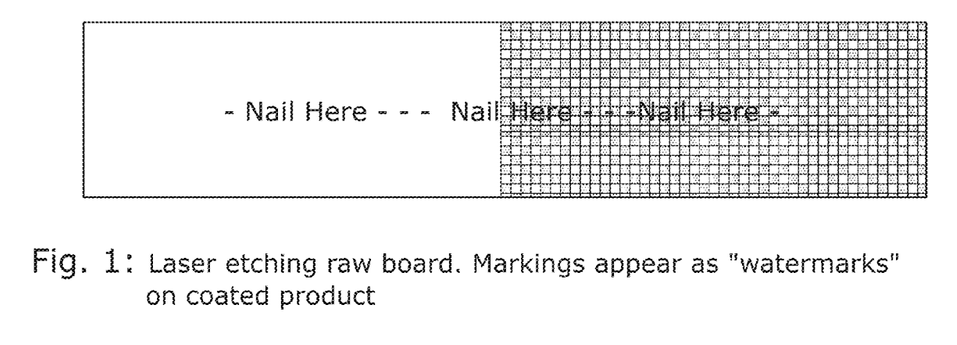
FIG. 1 is a schematic of a fibre cement board having been treated with laser irradiation to form an inscription (indicia), wherein the right-hand side of the board has been coated after the laser treatment and the inscription/indicia remains visible as a watermark.
Figure 2:
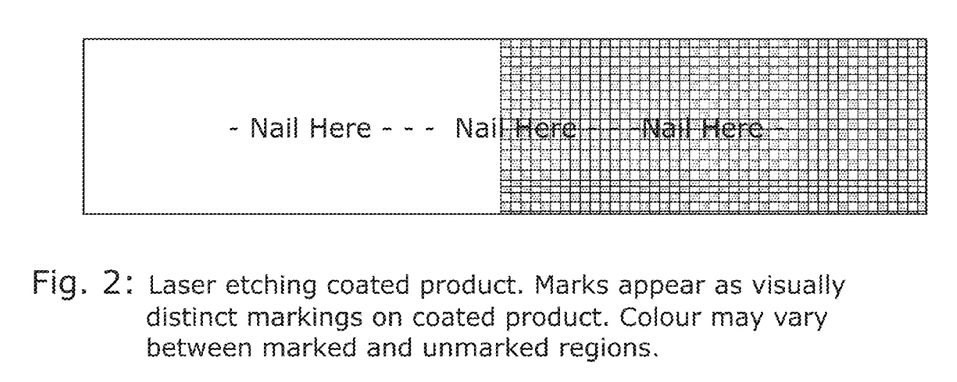
FIG. 2 is a schematic of a fibre cement board having a coating applied to the right hand side of the board and then having been treated with laser irradiation to form an inscription/indicia, wherein the inscription/indicia is visible on the right-hand side of the board as a colour change of the coating.
Figure 3:
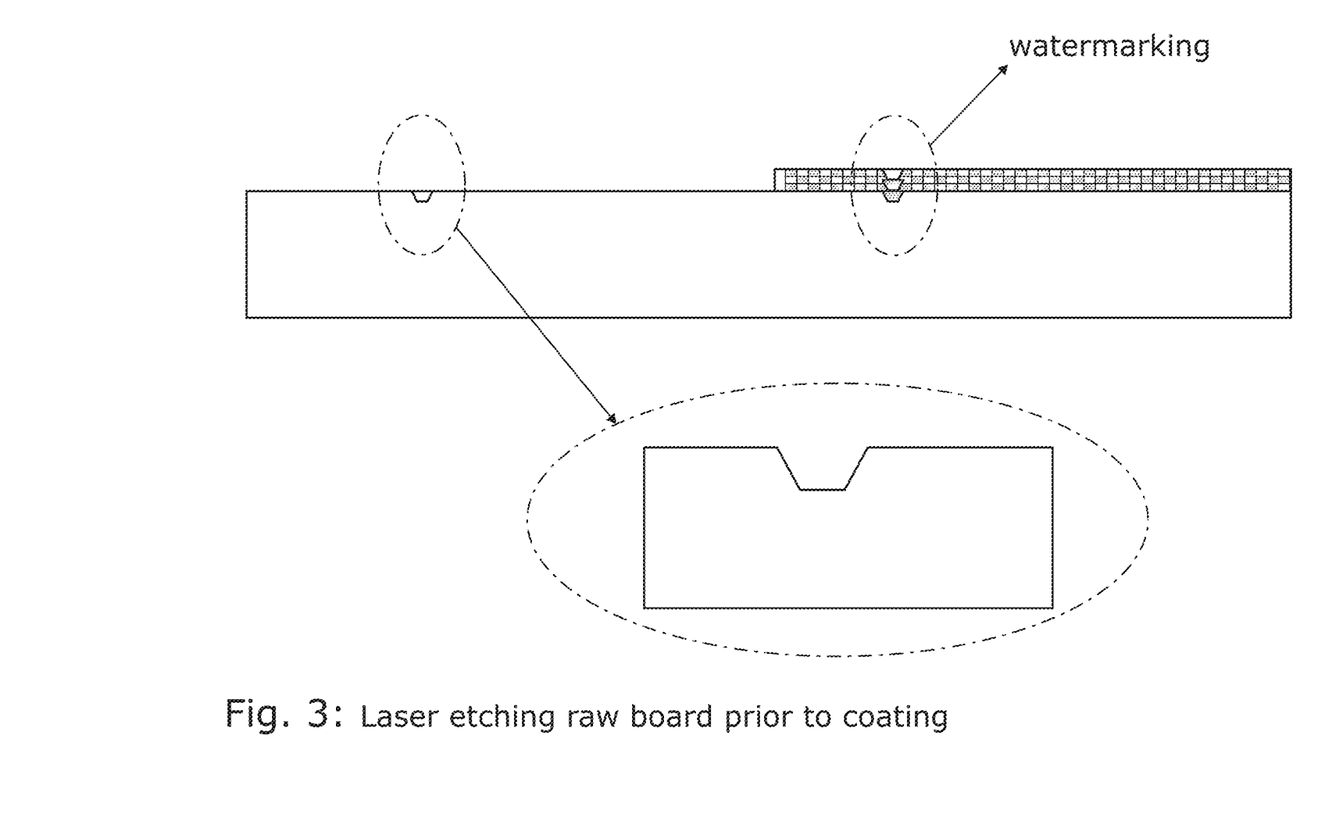
FIG. 3 is a sectional side view of a schematic of a fibre cement board showing laser treatment to form indicia (a shallow channel) and, on the right hand side of the board which has been coated, the resulting watermark.
Figure 4:
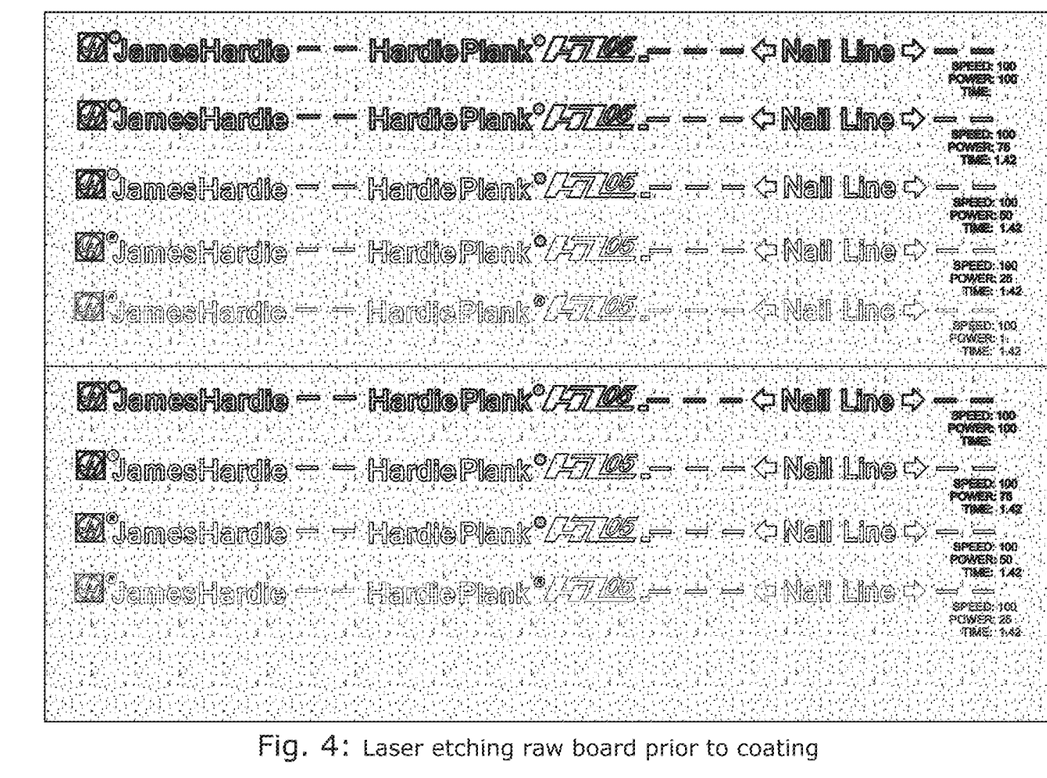
FIG. 4 is a photograph of a laser marked fibre cement board prior to coating.
Figure 5:
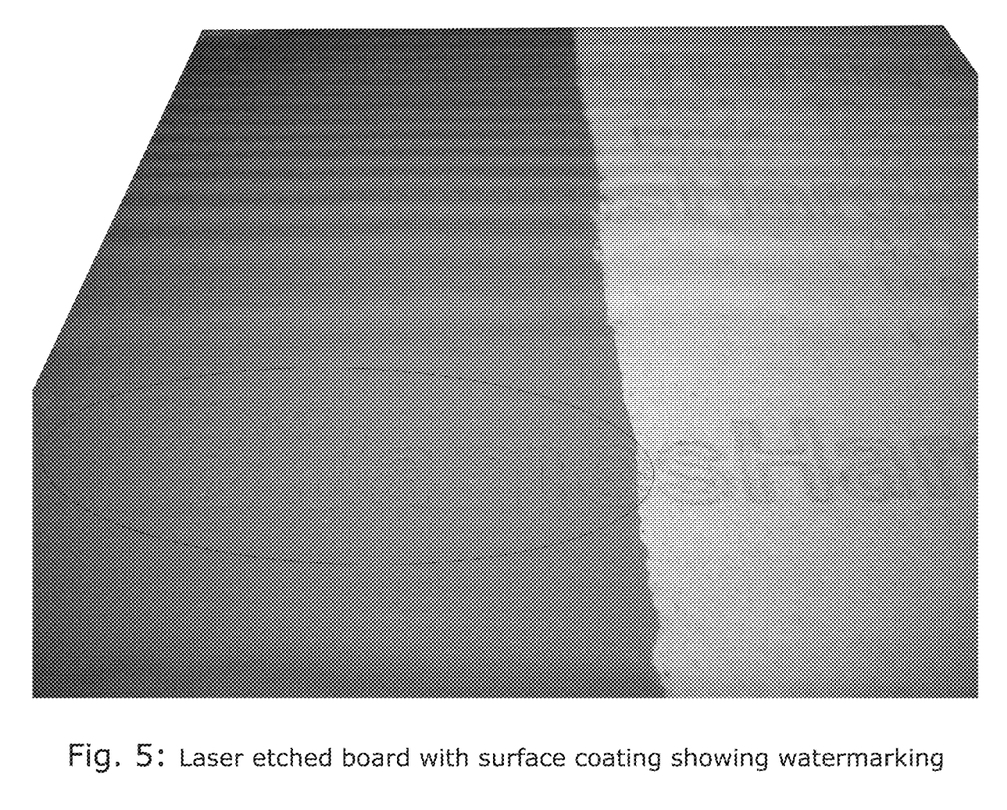
FIG. 5 is a photograph of the board shown in FIG. 4 and having a coating applied thereto (the watermarking is circled)

Autoclaved fibre cement sheets were irradiated with a $CO_2$ laser (see FIGS. 3, 4 and 6) and various surface patterns and markings were inscribed. The sheet shown in FIG. 3 was coated with a water based decorative surface paint coating and the resulting watermark can be seen in FIG. 4. The depth of the etching was up to 300 micron and since the coating thickness was approximately 100 micron the depth of the resulting watermark was up to 200 micron. The depth of etching may be controlled by varying the combination of laser type, the laser power, and marking speed of the beam.

Figure 6:
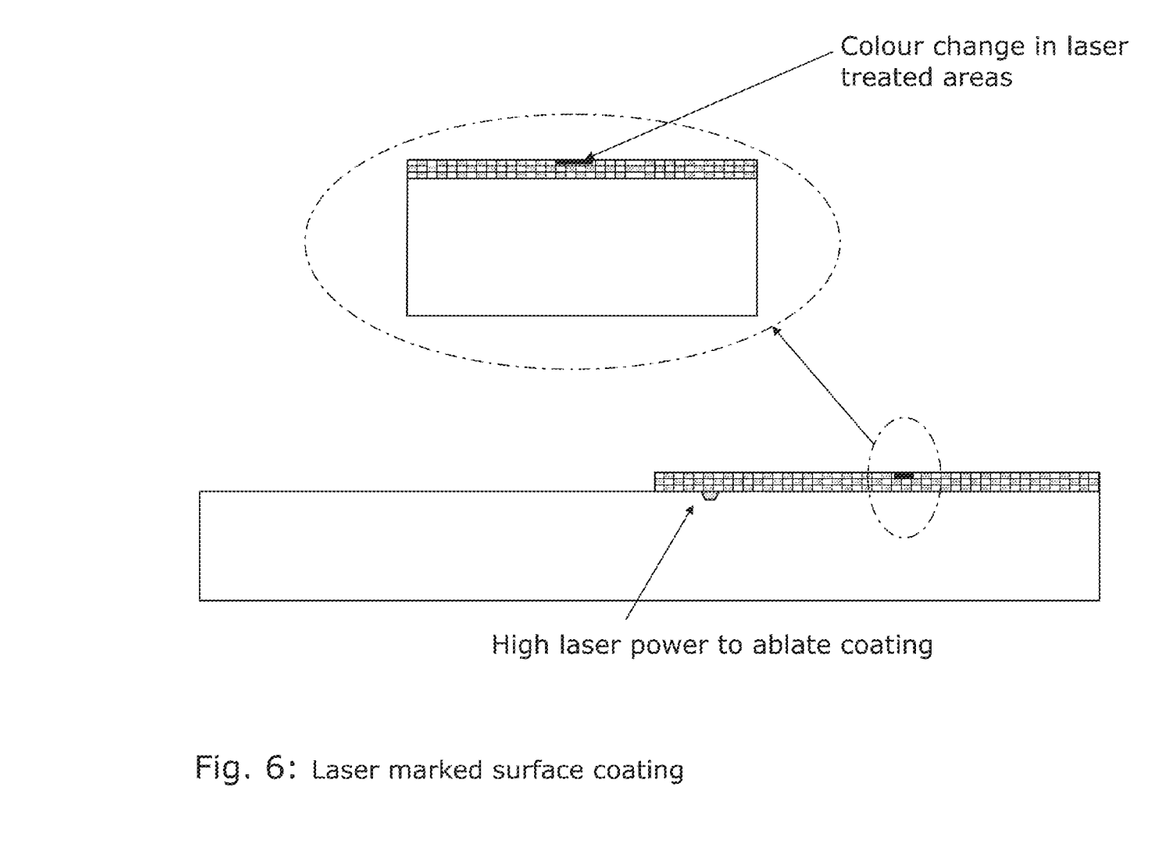
FIG. 6 is a sectional side view of a schematic of a coated fibre cement board showing laser treatment to discolour the coating to mark the coated board, and laser treatment to ablate the coating to mark the coated board.
Figure 7:
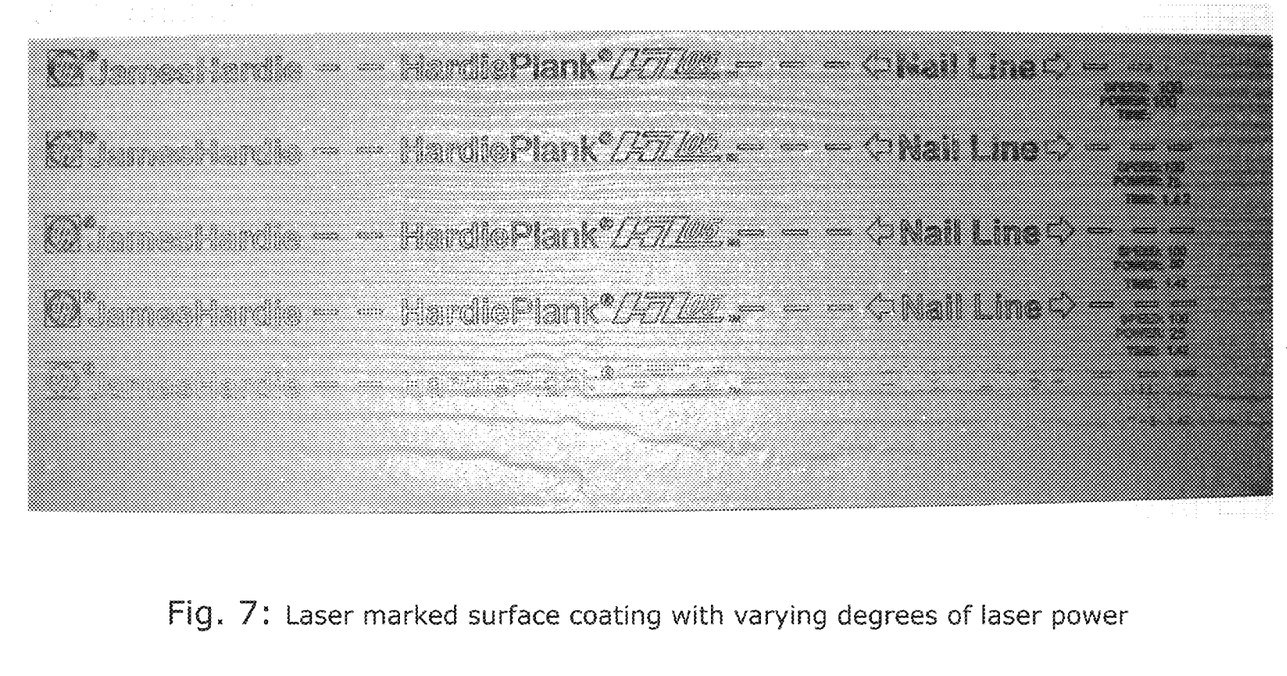
FIG. 7 is a photograph of a coated fibre cement board having had laser treatment at varying degrees of laser power and showing the resulting laser marking.

Referring now to FIG. 6, a coated sheet was laser treated to produce visible markings. The sheet shown in FIG. 6 had a water based paint composition applied as a surface coating and cured or dried to form a surface layer of approximately 100 microns thickness. The coated sheet was exposed to a predetermined combination of laser power and marking speed. The power ranges were 100 $W/cm^2$, 80 $W/cm^2$, 60 $W/cm^2$, 50 $W/cm^2$, 25 $W/cm^2$ and 10 $W/cm^2$. The marking speed ranged from 10 to 100 meters/minute. This was accomplished by moving the sheet past the laser at a predetermined linear speed. A combination of relatively low power, below 25 $W/cm^2$, and high marking speed, above 60 m/minute, produced visible markings in the applied coating, without creating any substantial damage to the coating integrity or quality. Without wishing to be bound by theory, it is believed that this colour change is the result of radiation effects on the pigments, dyes or fillers within the paint composition itself. By varying the combination of laser type, laser power and marking speed, a combined effect of marking and ablation can be produced. An increased laser power of 100 W/cm2 in combination with a lower marking speed of approximately 40 m/minute produced ablation of the paint coating during the marking process. The use of a YAG laser instead of a CO2 laser also improves the marking effectiveness.

Although the invention has been described with reference to specific examples, it will be appreciated by those skilled in the art that the invention may be embodied in many other forms. In particular features of any one of the various described examples may be provided in any combination in any of the other described examples.

We claim:

1. A method for providing a marked coated hydraulically bonded fiber cementitious substrate, the method comprising the steps of: treating a portion of an upper surface of the hydraulically bonded fiber cementitious substrate to form indicia; and applying an opaque surface coating on said cementitious substrate, wherein the surface coating covers said indicia and the upper surface of the cementitious substrate in a manner such that the indicia is disposed underneath the surface coating and yet remains visually perceptible.

2. A method according to claim 1 wherein the uncoated cementitious substrate is treated by etching the surface to form said indicia and the surface coating is then applied.

3. A method according to claim 1 wherein the indicia, or indicium, are channels or grooves.

4. A method according to claim 1 wherein the etching and the coating are selected to cause the indicia to be visually perceptible when the coating is cured.

5. A method according to claim 1 wherein said treatment is by laser radiation.

6. A method according to claim 1 wherein the treatment vitrescently marks the substantially cementitious substrate to form the indicia, without surface ablation.

7. A method according to claim 1 wherein the substrate is an uncured or "green" cementitious body, or is substantially cured.

8. A method according to claim 7 wherein said substrate is hydraulically bonded and comprises cellulose fibre reinforcement.

* * * * *